May 9, 1944.  E. M. SCOTT  2,348,227
CAN OPENER
Filed Dec. 12, 1942
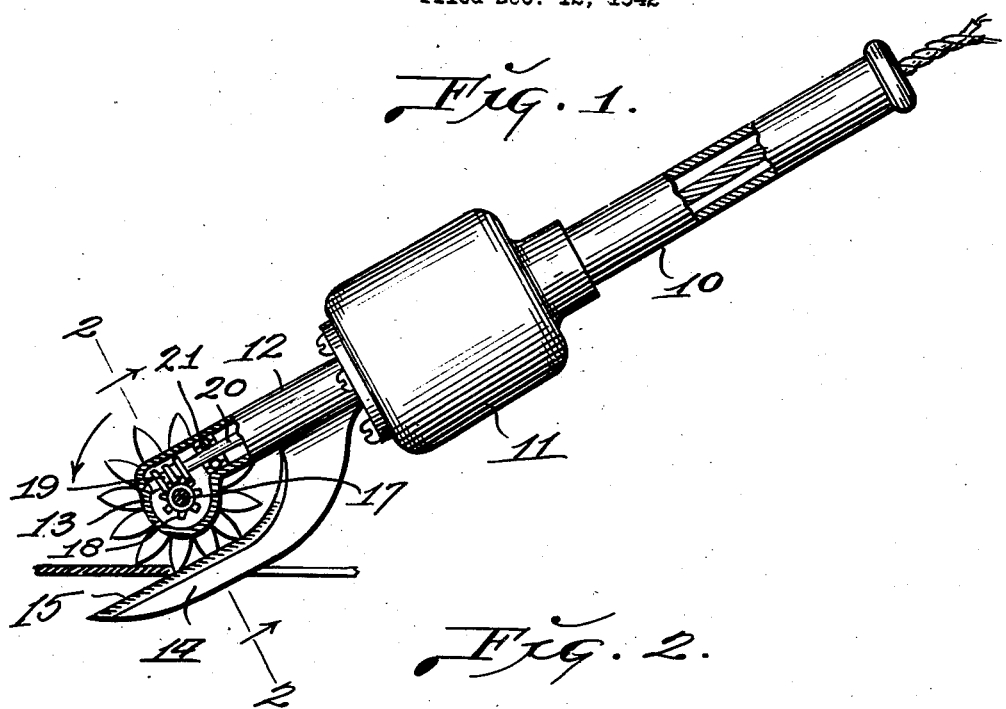
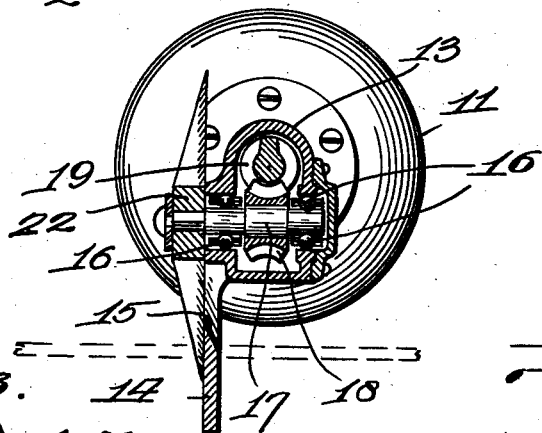
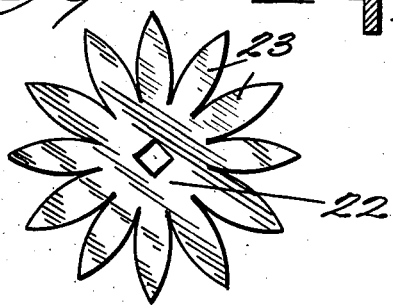
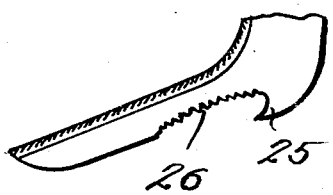
INVENTOR.
ELIZABETH M. SCOTT,
BY
Martin P. Smith, ATTY.

Patented May 9, 1944

2,348,227

UNITED STATES PATENT OFFICE 2,348,227

CAN OPENER

Elizabeth M. Scott, Los Angeles, Calif.

Application December 12, 1942, Serial No. 468,785

1 Claim. (Cl. 30—4)

My invention relates to can openers, and has for its principal object the provision of a relatively simple, practical and inexpensive can opener, wherein one of the cutters is rotated by a small electric motor mounted on the handle of the device.

A further object of my invention is to provide a can opener having a fixed blade that is adapted to be used as a prong that is inserted through the wall of the can, and which blade cooperates with a rotating cutter having a plurality of radially disposed blades, and which is driven by the electric motor carried by the handle of the opener.

With the foregoing and other objects in view, my invention consists in certain novel features of construction and arrangement of parts, which will be hereinafter more fully described and claimed, and illustrated in the accompanying drawing, in which:

Fig. 1 is a side elevational view of a can opener constructed in accordance with my invention, and with parts broken away, and in section.

Fig. 2 is an enlarged cross section taken on the line 2—2 of Fig. 1.

Fig. 3 is an elevational view of the rotary cutter.

Fig. 4 is a side elevational view of a modified form of the fixed blade of the opener.

Referring by numerals to the accompanying drawing, which illustrates a preferred embodiment of my invention, 10 designates a tubular handle on the forward end of which is mounted a housing 11 containing a conventional electric motor. The electrical connections to said motor enter the rear end of the handle 10, and extend lengthwise, therethrough to the binding posts of the motor. Secured to the forward end of the motor housing is the rear end of a forwardly projecting axial housing 12, the forward end portion 13 thereof being enlarged for the accommodation of certain operating parts of the device.

Formed integral with the under side of the rear portion of the housing 12 is a downwardly and forwardly projecting prong 14 pointed at its forward edge, and being beveled and sharpened as designated by 15, thereby forming a straight fixed cutting edge.

The intermediate portion of this fixed blade or prong is positioned a short distance below housing 13.

Journalled in anti-friction bearings 16, within housing 13, is a transversely disposed shaft 17, and secured thereon between said bearings is a worm wheel 18. Engaging the teeth of this worm wheel is a worm 19 which is carried by the forward end of a shaft 20, which latter is journalled in anti-friction bearings 21, and extends rearwardly through housing 12, and is directly connected in any suitable manner to the shaft of the motor within housing 11. The forward end of shaft 20 is journalled in a suitable bearing in the front end of housing 13.

One end of shaft 17 projects a short distance beyond the side wall of housing 13, and detachably mounted on said projecting end is a rotary cutting member 22 having a series of radially disposed pointed double edged cutting blades 23, (see Fig. 3).

In the use of my improved can opener, blade 14 functioning as a prong is forced through the wall of the can, and the opener is then moved forward with more or less force or pressure, and as the motor within the housing 11 operates, shaft 20 will be rotated, and the worm 19 carried by said shaft will engage the teeth worm 18 to rotate shaft 17 which carries the rotary cutting wheel 22.

The flat side faces of the blades of the rotary cutter lies against one of the side faces of fixed plate 14, and thus, the edges of the rotary cutter cooperates with the sharp edge of plate 14 to cut the sheet metal wall of the can, thus accomplishing the desired result.

In operation, the radial plates 23 of the rotary cutters move past the cutting edge 15 of the fixed plate 14, thus producing a shear cut which is very effective in accomplishing the desired results.

Where it is not convenient to connect the can opener to a suitable source of electric current supply, the opener may be operated by hand power, and where so operated, the opener is pushed forward after blade 14 has been inserted through the wall of the can, and the force applied by hand, together with the weight of the motor, and its housing is sufficient to cause the rotary blade cutter 22 to rotate and cooperate with the fixed blade in cutting the wall of the can.

In Fig. 4 I have shown the fixed blade provided on the rear portion of its lower edge with a forwardly presented hook 25, to be used in removing bottle caps, and the edge immediately in front of said hook is serrated 26, so as to grip the upper surface of bottle caps and thereby prevent slipping of the opener while the caps are being removed.

My improved can opener saves much time and energy in the opening of cans, and as the fixed blade is positioned in the can, the opener cannot slip off the can or bruise the hands of the user.

Thus it will be seen that I have provided a can opener that is relatively simple in construction, inexpensive of manufacture, and very effective in performing the functions for which it is intended.

It will be understood that minor changes in the size, form and construction of the various parts of my improved can opener may be made and substituted for those herein shown and described without departing from the spirit of the invention, the scope of which is set forth in the appended claim.

I claim as my invention:

In a can opener, a handle provided in its forward end with a housing, transversely aligned bearings in the ends of said housing, a shaft journalled in bearings, a rotary cutter carried by one end of said shaft, said cutter having a plurality of radially disposed edged blades, a blade rigidly secured to the handle to the rear of the said shaft which fixed blade projects forwardly beneath said housing and shaft past the lower portion of said rotary cutter, the upper edge of said fixed blade being provided with a cutting edge, a longitudinally disposed shaft journalled for rotation in the forward portion of said handle, driving connections between said shaft and the transversely disposed shaft and an electric motor carried by said handle to the rear of said fixed blade for driving said longitudinally disposed shaft.

ELIZABETH M. SCOTT.